United States Patent [19]

Brown et al.

[11] 4,128,841

[45] Dec. 5, 1978

[54] DROPLET MICROPHONE

[75] Inventors: Michael K. Brown, Canton; Kyriakos Christou, Livonia; David E. Lundquist, Birmingham; Earl P. Maidment, Royal Oak; Ronald G. Shell, Dearborn Heights, all of Mich.

[73] Assignee: Burroughs Corporation, Detroit, Mich.

[21] Appl. No.: 837,645

[22] Filed: Sep. 28, 1977

[51] Int. Cl.[2] .............................................. G01D 15/18

[52] U.S. Cl. ...................................................... 346/75

[58] Field of Search ........................................... 346/75

[56] References Cited

U.S. PATENT DOCUMENTS

| | | | |
|---|---|---|---|
| 3,562,761 | 2/1971 | Stone et al. | 346/75 |
| 4,012,745 | 3/1977 | Brown et al. | 346/75 X |
| 4,067,019 | 1/1978 | Fleischer | 346/75 |

OTHER PUBLICATIONS

Helinski, E. F. et al., Velocity Control for Ink Jet Recorder, Jul. 1974, pp. 368-369, vol. 17, No. 2, IBM Technical Disclosure Bull.

*Primary Examiner*—George H. Miller, Jr.

*Attorney, Agent, or Firm*—Charles P. Sammut; David R. Syrowik; Carl Fissell, Jr.

[57] ABSTRACT

A microphone is provided for converting the impact force of a moving charged droplet into a corresponding electrical signal. A vertical support member supports a diaphragm in the path of the moving droplet. The diaphragm flexes or vibrates in response to a group of impinging droplets. A bimorph piezo-electric element is in contact with the diaphragm to move therewith and is fixedly secured at its opposite end to an adjacent housing member. The bimorph generates an electrical signal in response to bending stresses created when the bimorph is bent.

8 Claims, 4 Drawing Figures

DROPLET MICROPHONE

BACKGROUND OF THE INVENTION

The subject invention relates in general to microphones or transducers and in particular to microphones or transducers used to provide a feedback signal upon being impacted by ink droplets.

In the technology of ink jet printing by the use of liquid droplets propelled from a fine orifice, an element of the printer that must be considered is the means by which proper droplet charging synchronization can be detected. The synchronization can be detected by using a very narrow test charging pulse applied to the droplet charging electrode as shown in U.S. Pat. No. 4,012,745 to brown et al, having a common assignee as the subject application. A sequence of such pulses applied in a proper phase relation to the droplet formation can result in the test charging and subsequent downward deflection of the droplets. This downward deflection can produce a change in the impact upon the surface of the droplet catcher microphone element. One of the difficulties in the existing art is the large amount of mechanical noise generated in a non-impact ink jet printer due to the air flow in which the ink droplets travel to reduce the Reynolds number. This noise interferes with the desired signals produced by the impacts of the downward deflected droplets upon the surface of the microphone catcher. Electrical noise is also a problem if the microphone catcher is placed close to the charged deflection plates. Special electronic circuit means must be used to filter the electrical signals to produce an acceptable siganl at the microphone amplifier.

The U.S. Pat. No. to Keur et al, 3,465,351 discloses a drop detector having a piezo-electric material body which generates a pulse output responsive to every drop which falls upon the piezo-electric material.

IBM Technical Disclosure Bulletin, Vol. 15, No. 5, October 1972, discloses a drop-sensing device using a piezo-electric material sandwiched between a support structure at its upper surface and a deflecting member at its lower surface. A sensing result from the piezo-electric material is applied to a circuit which alters the phase position of droplet generation and voltage at the charging electrodes of the ink jet printer.

There are a number of desirable features for a droplet microphone not shown by the prior art patents or publications. For example, it is desirable to combine an ink catcher and a microphone detector which minimizes splash of the conductive ink and also shields the transducing piezo-electric elements from the ink; if a cantilever arm bimorph is used, its length can be selected with the resonant frequency of the system in mind; and a diaphragm element can be used to receive the impact force of the moving droplets and can be disposed at an angle relative to the droplet path to minimize the splash of the ink used.

SUMMARY OF THE INVENTION

A device for converting the impact force of a moving droplet into a corresonding electrical signal constructed in accordance with the instant invention comprises flexing means disposed in the path of the moving droplet for flexing in response to an impinging droplet. Also provided is a support means for supporting the flexing means in the droplet path and a transducer means including a cantilever. One end of the cantilever is fixedly secured to the support means and the opposite end is operatively associated with the flexing means to move therewith. The cantilever generates an electrical signal when the cantilever experiences bending deformation.

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
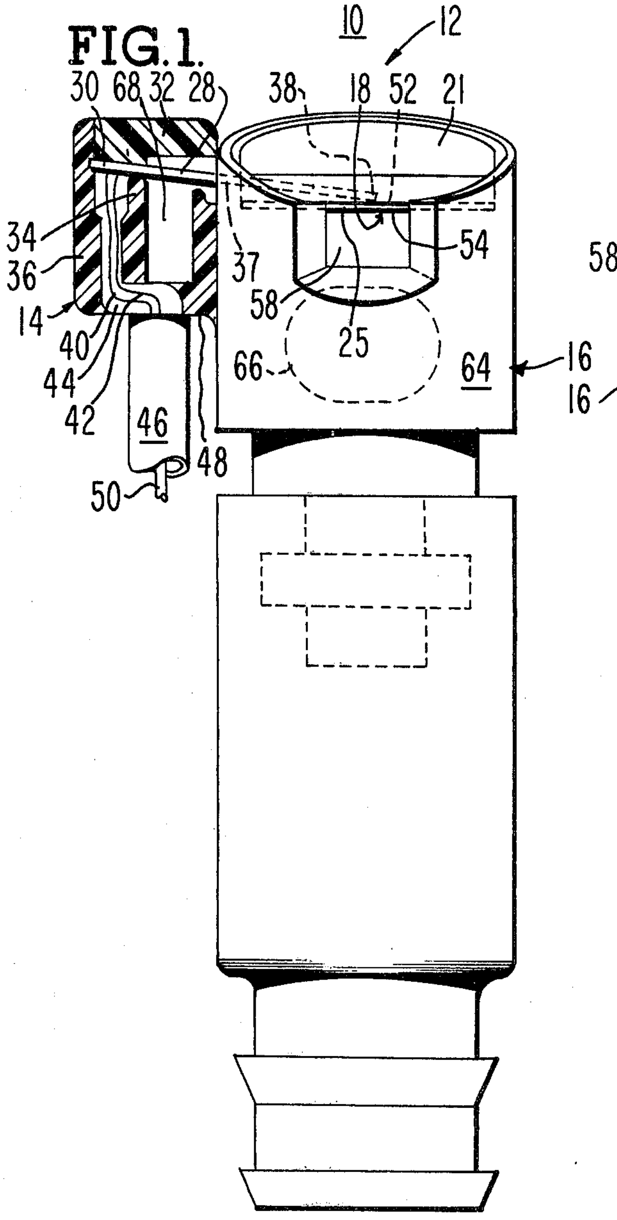
FIG. 1 is a front view partially in cross-section and partially broken away of the microphone device.
Figure 2:
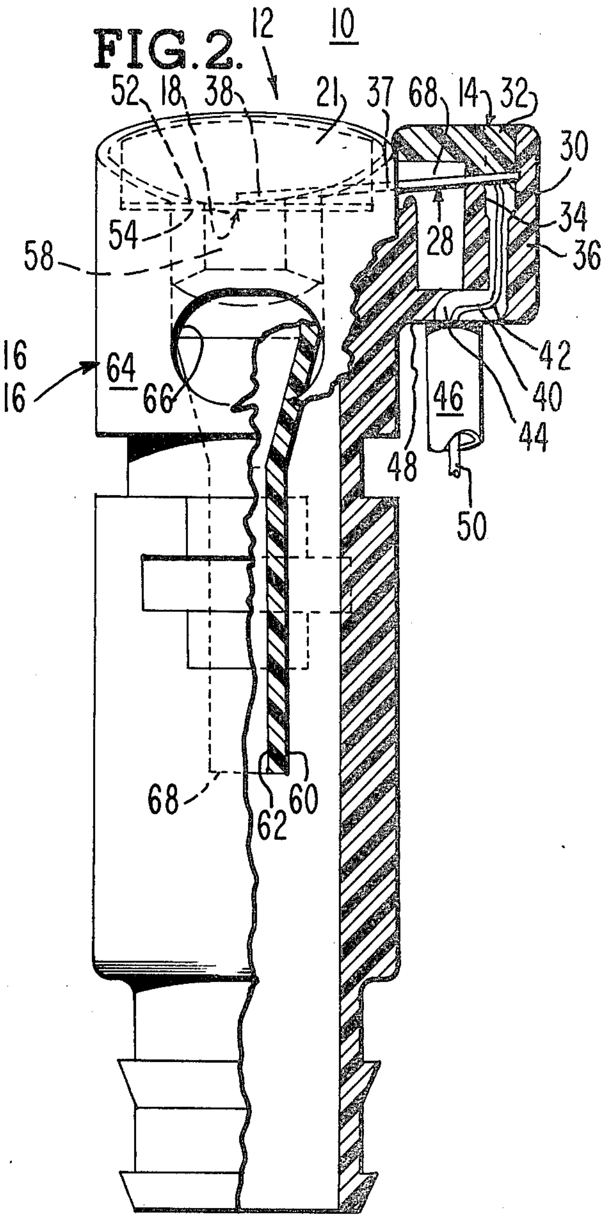
FIG. 2 is a back view partially in cross-section and partially broken away of the microphone device.

A microphone device of the subject invention is generally shown in FIG. 1 and FIG. 2 at 10. The subject microphone device 10 converts the impact force of a moving droplet into a corresponding electrical signal as described in greater detail hereinafter.

The microphone device 10 includes support means which, in turn, includes a vertical support member generally indicated at 12 and an adjacent housing member generally indicated at 14 integrally molded therewith the vertical support member.

Figure 3:
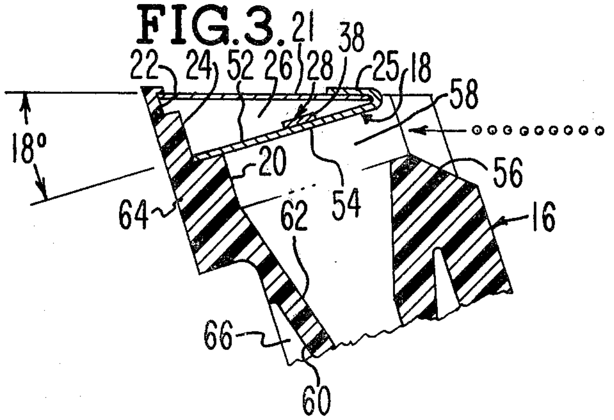
FIG. 3 is a side view partially broken away and in cross-section of the microphone device.
Figure 4:
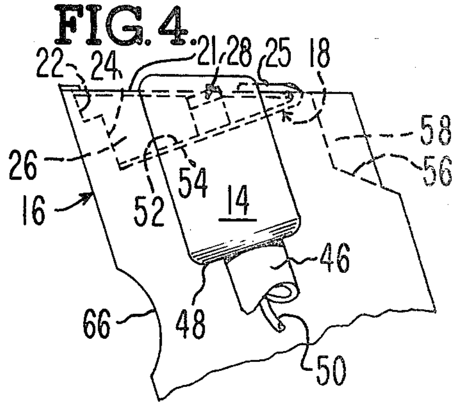
FIG. 4 is a side view opposite the view shown in FIG. 3 partially broken away of the microphone device.

The vertical support member 12 includes a holding means or a retainer generally indicated at 16 for holding a flexing means or a diaphragm generally indicated at 18 in the path of the moving droplets as shown in FIG. 3. The diaphragm 18 is bonded by means of an epoxy resin to a shoulder portion 20 of the retainer 16. The support means also includes a circular cover plate 21 which is bonded in a slot 22 also with an epoxy. The slot 22 is formed circumferentially about the inner surface 24 of the retainer 16. A lip portion 25 of the diaphragm 18 is bent or crimped over the portion of the outer edge of the cover plate 21 not within the slot 22.

The inner surface 24 of the retainer 16 combines with the cover plate 20 and the diaphragm 18 to define a cavity 26 wherein a transducer means or a cantilever bimorph generally indicated at 28 is disposed.

A first end 30 of the bimorph 28 is fixedly secured to the housing member 14 by an epoxy resin covering 32. The covering 32 secures the firest end 30 of the bimorph 28 against an upper support 34 and within an outer wall 36 of the housing member 14. The bimorph 28 extends through an aperture 37 in the retainer 16 and into the cavity 26.

A second or opposite end 38 of the bimorph 28 is operatively associated or bonded to the diaphragm 18 to move therewith the diaphragm 18.

As is well known in the art, the bimorph or bimorph cell 38 comprises a pair of piezo-electric ceramic crystal elements in rigid combination bonded together to act as an electromechanical transducer. The bimorph 28 exhibits a piezo-electric effect in that when the bimorph 28 is subjected to mechanical stress arising from bending, or bending deformation, the bimorph 28 produces a voltage which appears at lines 40 and 42 which are disposed in the passageway 44 between the upper support 34 and the outer wall 36 of the housing member 14. A wire shield 46 is fixedly secured at the bottom surface 48 of the housing member 14 to provide a conduit or path for a cable 50 defining the wires 40 and 42.

The diaphragm 18 has a top surface 52 and a bottom surface 54 as shown in FIG. 3, the second end 38 of the bimorph 28 is secured at the upper surface 52 of the diaphragm 54. The bottom surface 54 of the diaphragm 18 receives the impact of the moving droplets.

The bottom surface 54 of the diaphragm 18 and a first slanted peripheral surface 56 of the retainer 16 define a droplet input port 58 through which the droplets travel before striking the bottom surface 54 of the diaphragm 18. An elongated portion 60 of the retainer 16 extends from the bottom surface 54 and the droplet input port 58 away from the bottom surface 54. The portion 60 defines a cylindrical return passageway 62 which is in fluid communication with the droplet input port 58 to transport conductive ink droplets away from the bottom surface 54 of the diaphragm 18 after being impacted thereon.

The retainer 16 has an outer cylindrical wall 64 which in turn has an air input port 66 extending therethrough. The air input port 66 is in fluid communication with the end of the return passageway 62 opposite the bottom surface 54 of the diaphragm 18. The air input port 66 accepts air which flows past the end of the return passageway 62 thereby causing a greater flow of air to pass through the passageway 62 and further drawing the ink therethrough.

The housing member 14 further contains a cavity 68 which can be filled to greater or lesser degree with epoxy which effectively increases or decreases the effective length and therefore controls the resonant frequency of the system comprising the diaphragm 18 and the bimorph 28 which has a particular characteristic frequency. In this way, the effective length of the bimorph 28 can be made to correspond to the resonant frequency of the vibrating diaphragm and bimorph system as the droplets impact on the diaphragm 18. By increasing the active volume of the bimorph 28, the microphone signal amplitude is increased. By allowing the bimorph 28 to extend through the aperture 37 in the retainer sidewall 64 and extend thereinto the housing member 14 the effective length and thereby the effective volume of the bimorph 28 can be easily controlled by the addition or removal of epoxy.

The invention has been described in an illustrative manner and it is to be understood that the terminology which has been used is intended to be in the nature of words of description rather than of limitation.

Obviously, many modifications and variations of the present invention are possible in light of the above teachings. It is therefore to be understood that within the scope of the appended claims, the invention may be practiced otherwise than as specifically described.

The embodiments of the invention in which an exclusive property or privilege is claimed are defined as follows.

1. A device for converting the impact forces of a moving stream of droplets into a corresponding electrical signal, said device comprising:

flexing means disposed in the path of the moving droplet for flexing in response to an impinging droplet;

support means for supporting said flexing means in the droplet path; and piezo electric transducer means including a cantilever, one end thereof being fixedly secured to said support means and the opposite end being operatively associated with said flexing means to move therewith the flexing means for generating an electrical signal, said cantilever experiencing bending deformation, wherein the structure including said flexing means and said transducer means has a resonant frequency substantially equal to an integral multiple of the frequency of said stream of droplets.

2. The device as defined in claim 1 wherein said flexing means includes a diaphragm and wherein said support means includes holding means for holding said diaphragm in said droplet path.

3. The device as defined in claim 2 wherein said diaphragm has a top surface and a bottom surface and wherein said opposite end of said cantilever is in contact with said top surface, the droplets impinging on said bottom surface.

4. The device as defined in claim 3 wherein said support means includes a cover plate, said holding means, said diaphragm and said cover plate defining a cavity, said cantilever being disposed within said cavity.

5. The device as defined in claim 4 wherein said holding means has an aperture extending therethrough, said cantilever being disposed therein said aperture to move transverse to the longitudinal axis of said cantilever arm in response to said diaphragm movement.

6. The device as defined in claim 3 wherein said holding means and said bottom surface define a droplet input port.

7. The device as defined in claim 6 wherein a portion of said holding means extends from said bottom surface and said droplet input port, said portion defines a return passageway in fluid communication with said droplet input port.

8. The device as defined in claim 7 wherein said support means has an air input port extending therethrough in third communication with said return passageway.

* * * * *